Dec. 18, 1934.  F. J. KREUTZER  1,985,037
FARM BUILDINGS
Filed Oct. 25, 1932  3 Sheets-Sheet 1

INVENTOR
FREDERIC J. KREUTZER.
BY
ATTORNEYS

Dec. 18, 1934.  F. J. KREUTZER  1,985,037
FARM BUILDINGS
Filed Oct. 25, 1932   3 Sheets—Sheet 2

INVENTOR
FREDERIC J. KREUTZER.
BY
ATTORNEYS

Dec. 18, 1934.   F. J. KREUTZER   1,985,037
FARM BUILDINGS
Filed Oct. 25, 1932   3 Sheets-Sheet 3

INVENTOR
FREDERIC J. KREUTZER.
BY
ATTORNEYS

Patented Dec. 18, 1934

1,985,037

UNITED STATES PATENT OFFICE 1,985,037

FARM BUILDINGS

Frederic J. Kreutzer, Elmira, N. Y., assignor to James Manufacturing Company, Fort Atkinson, Wis., a corporation of Wisconsin Application October 25, 1932, Serial No. 639,489

14 Claims. (Cl. 35—16)

My invention relates to a method illustrating and demonstrating varying combinations which can be erected for use as farm buildings of standardized construction; my invention is an apparatus therefor.

It is the object of my invention to provide a demonstration set for a salesman, engineer or architect to illustrate to a customer by a system of models of unitary construction and a system of sheets representing feed lots and fields, roads, etc. of a farm, the varying combinations possible with standardized buildings for providing feed containers, barns, milking stations and the like.

It is my object to provide in a demonstration set which can be carried by hand, by a set of interchangeable standardized parts of a model and by a supporting board for a plurality of layout sheets, the different combinations that the prospective engineer, architect, or purchaser may desire.

Referring to the drawings, Figure 1 shows a standard sheet preferably mounted upon a supporting board in one or more sections. This sheet is printed with the design of a typical layout of roads and building locations showing the buildings in horizontal section.

Figure 1:
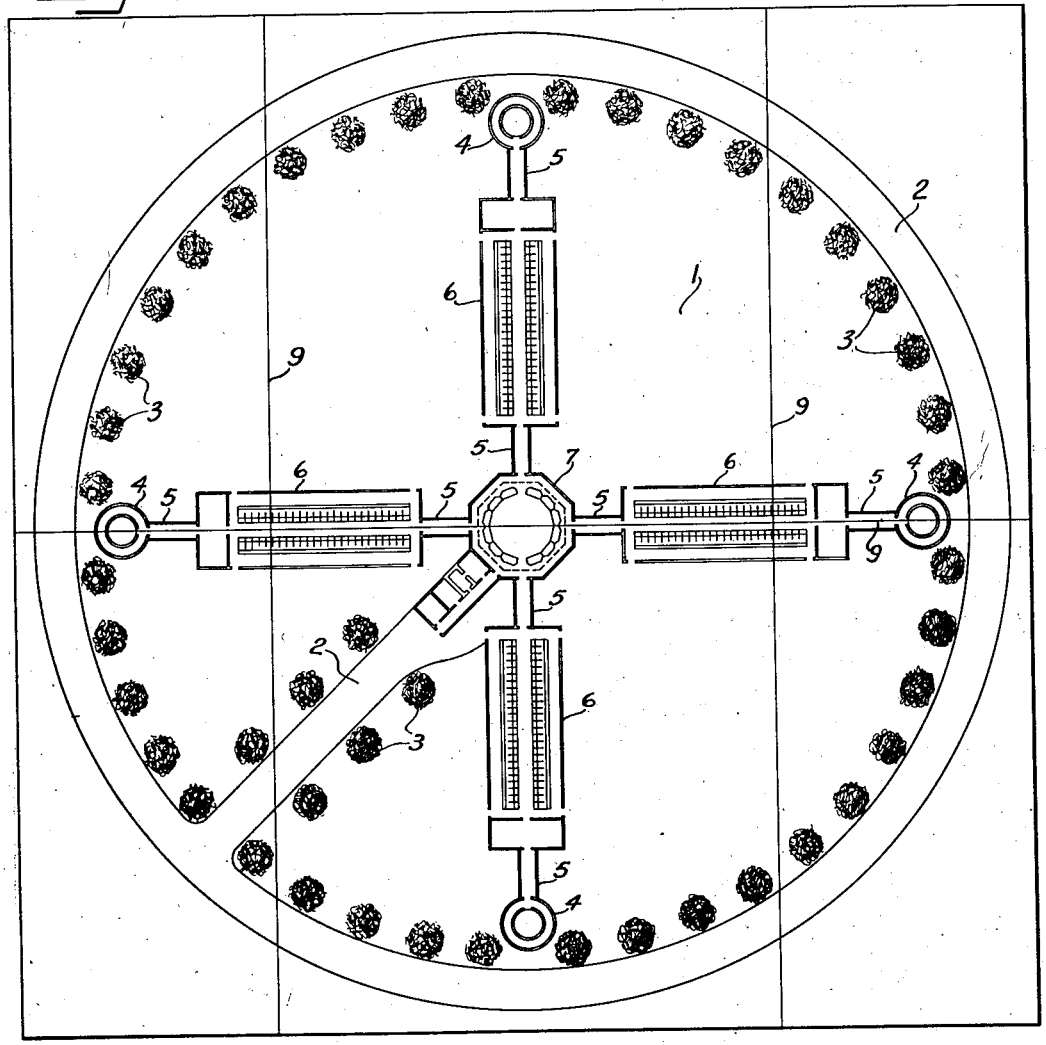
Figure 2:
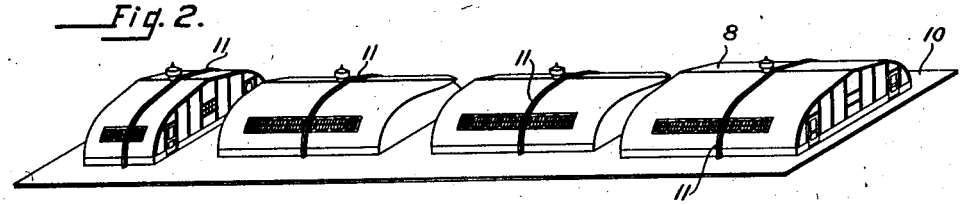
Figure 2 is a perspective of the model barns or buildings for milking stations, buildings for box stalls for cows and calves and the like, carried upon a supporting board under elastic retaining bands.
Figure 3:
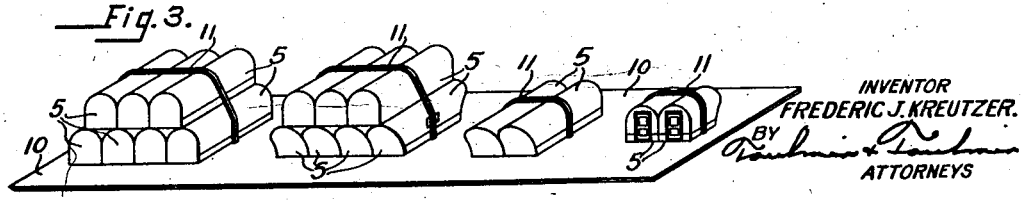
Figure 3 is a similar board having similar bands supporting various types of interchangeable communicating buildings.
Figure 4:
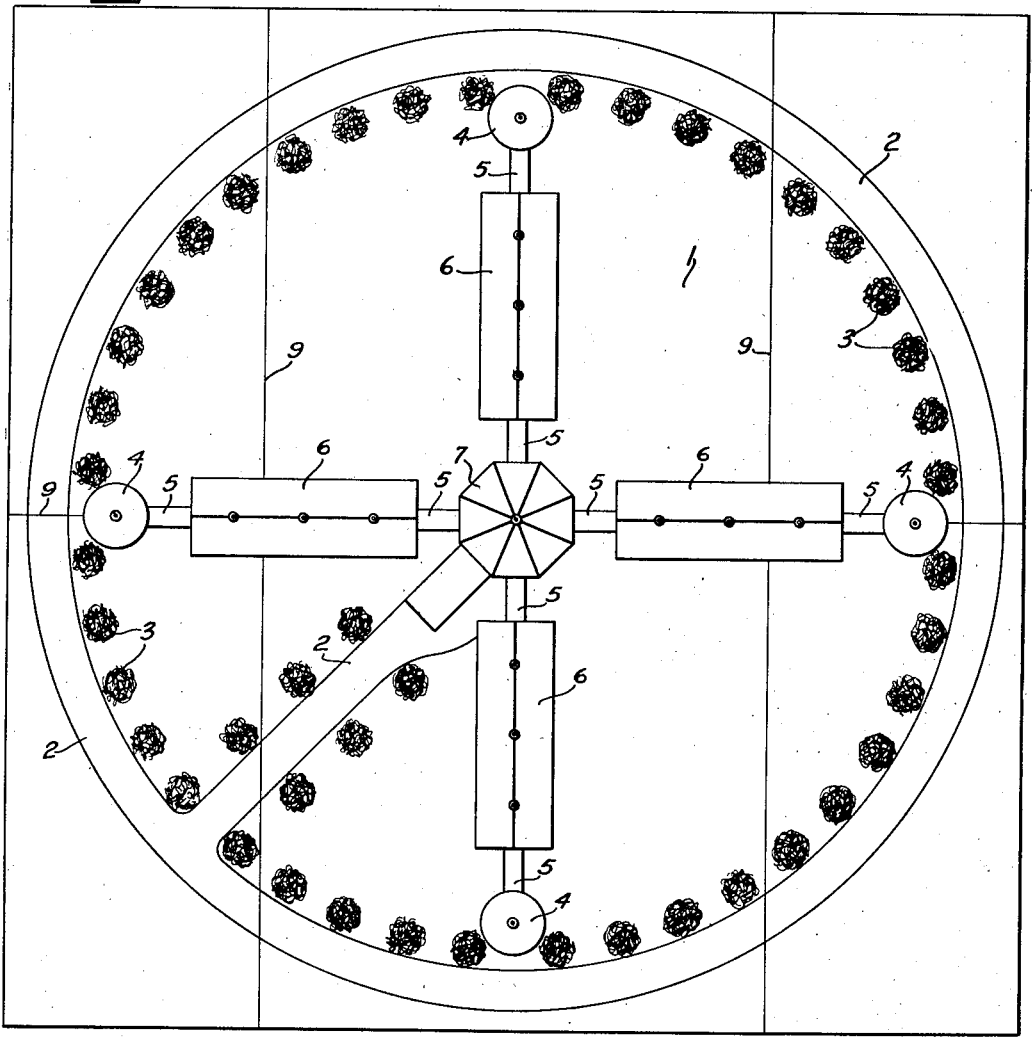
Figure 4 is a plan view of the sheet shown in Figure 1 with the model buildings in position.
Figure 5:
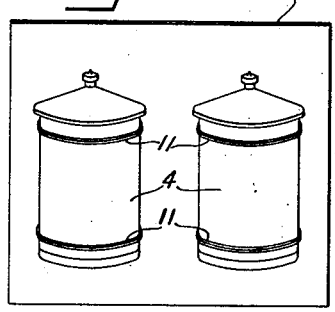
Figure 5 is a sheet showing in perspective the model feed containers.
Figure 6:
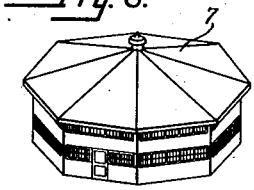
Figure 6 is a perspective of the model milking station.
Figure 7:
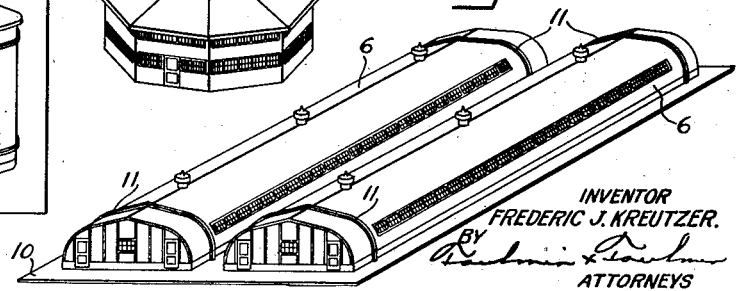
Figure 7 is a perspective of the model barns mounted on sheets having elastic bands.
Figure 8:
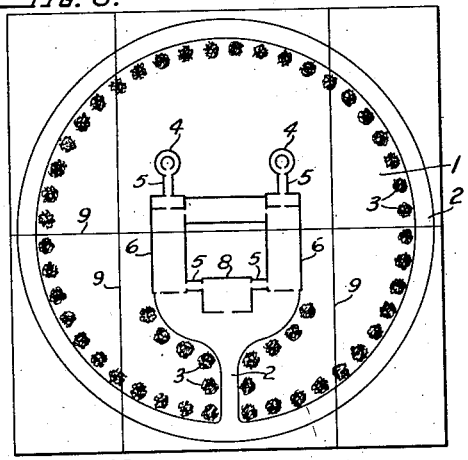
Figures 8, 9, 10, 11, 12 and 13 illustrate the layout sheets showing different combinations of the model buildings illustrated in Figures 2, 3, 5, 6 and 7.
Figure 9:
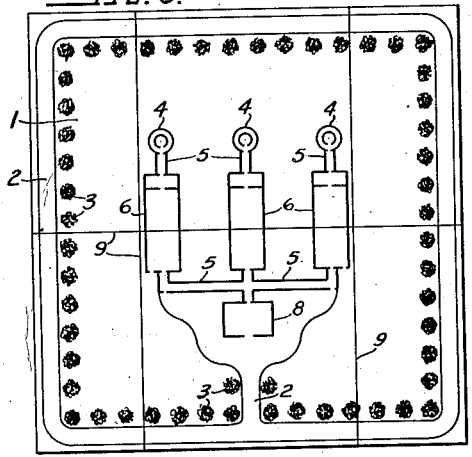
Figure 10:
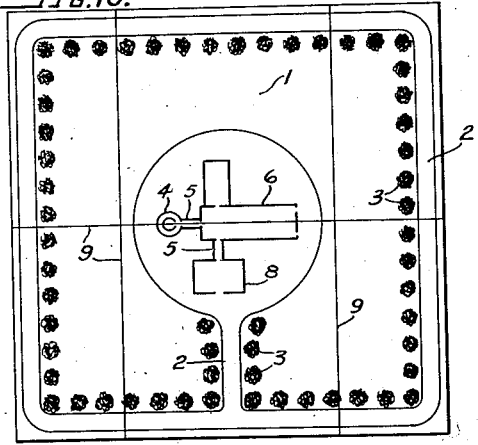
Figure 11:
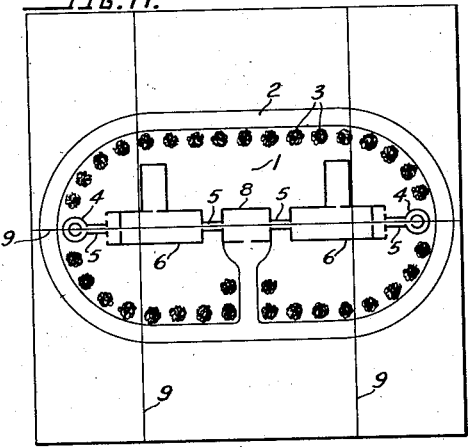
Figure 12:
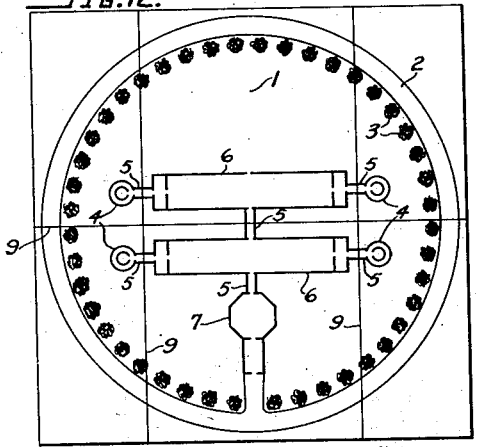
Figure 13:
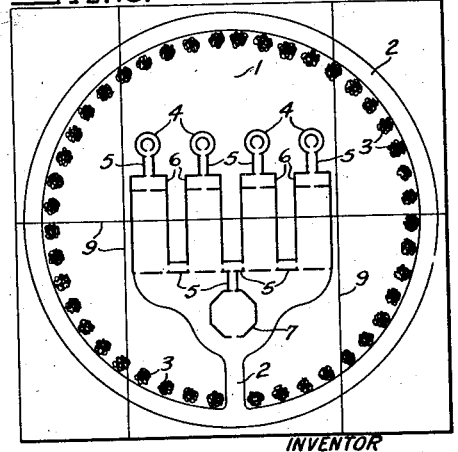

Referring to the drawings in detail, I provide a layout sheet such as shown in Figures 1 and 8 to 13, which has drawn or printed upon it in some manner, preferably in color, a typical layout of exercise or feed lots 1, roads 2, trees 3, with the building locations printed in outline as in horizontal section, indicating the feed containers 4, communicating buildings 5, barns 6 and milking stations 7 or 8. This sheet may be mounted upon a board divided along the section lines indicated at 9 so that a relatively large layout can be divided into individual parts and assembled in varying combinations. If desired, a plurality of the layout sheets may be hinged on one edge to a single supporting board so that they may be successively printed and supported by the board.

In order to permit the customer to visualize the prospective buildings that are to be erected and to determine whether they will fit the terrain which he has on his farm, a typical layout sheet is selected as in Figures 1 or 8 to 13, or any variations thereof. There are then placed upon the sheet the outlines of the location of the buildings, which are drawn to scale, then models of the buildings. These models are carried upon supporting boards 10 by resilient straps 11. From the supply of these models, which are also to scale, the exact relationship of the buildings to the ground in the exact proportions may be visualized.

Whether the installation amounts to hundreds or many hundreds of thousands of dollars, the relationship of the buildings in their proportions to the ground can be easily visualized and such changes or modifications made by the prospective customer, or architect or engineer that will fit the requirements of the farm or dairy employing these buildings.

By means of this demonstration set, the flexibility of these buildings, their standard construction, their capacity for arrangement in varying combinations and capacity for extension of a large group of buildings are all factors that are easily demonstrated.

It will be understood that I desire to comprehend within my invention such modifications as may come within the scope of my claims and my invention.

Having thus fully described my invention, what I claim as new and desire to secure by Letters Patent is:

1. In a demonstration set for illustrating the combinations of standardized buildings, the combination of a layout sheet having the arrangement of the buildings printed thereon to scale and removable models built to scale adapted to be fitted thereon to represent the ultimate appearance of the assembled buildings according to the plan on the sheet.

2. In a demonstration set for illustrating the combinations of standardized buildings, the combination of a layout sheet having the arrangement of the buildings printed thereon to scale and removable models built to scale adapted to be fitted thereon to represent the ultimate appearance of the assembled buildings according to the plan on the sheet, and terrain features likewise printed thereon to scale to show their relationship to the buildings.

3. In an equipment for demonstrating the arrangement and location and proportions of buildings, a layout sheet drawn to scale having various locations of the buildings printed thereon, and a set of models made to a similar scale of each of the standardized buildings adapted to engage and abut one another in varying combinations as printed on the sheet.

4. In an equipment for demonstrating the arrangement and location and proportions of buildings, a layout sheet drawn to scale having various locations of the buildings printed thereon, and a set of models made to a similar scale of each of the standarized buildings adapted to engage and abut one another in varying combinations as printed on the sheet, and means for separately and detachably but firmly holding said models in groups on separate sheets, from which sheets the building models can be supplied for building up the varying groups indicated on the layout sheets.

5. In a model demonstration of buildings, the combination of a printed form indicating the arrangement of the buildings and a plurality of scale models representing barns, milking stations, feed containers and interconnecting buildings.

6. In a demonstration set for illustrating the combinations of standardized buildings, the combination of a plurality of layout sheets each having a different connected arrangement of the buildings outlined thereon to scale, and removable three-dimension models representing different types of unitary buildings built to scale each adapted to be fitted upon corresponding parts of the outlined representations of the buildings to represent the ultimate appearance of the removable connected buildings according to the plan on the sheet, each sheet being composed of a plurality of parts capable of separation to allow additions of parts of other sheets to provide varying combinations of different size layouts.

7. In combination, a plurality of model buildings made to scale to be used with a plurality of layout sheets, certain of said models being made of different heights, widths, and lengths than others of said models in order to represent various sizes and kinds of buildings and the arrangement thereof, certain of said models having overhanging upper roof portions at least at one of their ends to allow connection to one side of the curved roof of another model, the ends of certain of said models being constructed to abut each other, and others of said models having cooperating side portions whereby they may appear to be attached to each other in parallel relation.

8. In a demonstration set for illustrating the combinations of standardized buildings, the combination of a sheet having a connected arrangement of the buildings outlined thereon to scale, and removable three-dimension models representing different types of unitary buildings built to scale each adapted to be fitted upon corresponding parts of the outlined representations of the buildings to represent the ultimate appearance of the removable connected buildings according to the plan on the sheet, said sheet being composed of a plurality of parts capable of separation to allow additions of parts of other sheets to provide varying combinations of different size layouts.

9. In a demonstration set for illustrating the combinations of standardized buildings, the combination of a plurality of layout sheets each having a different connected arrangement of the buildings outlined thereon to scale, and removable three-dimension models representing different types of unitary buildings built to scale each adapted to be fitted upon corresponding parts of the outlined representations of the buildings to represent the ultimate appearance of the removable connected buildings according to the plan on the sheet.

10. In a demonstration set for illustrating the combinations of standardized buildings, the combination of a sheet having a connected arrangement of the buildings outlined thereon to scale, and removable three-dimension models representing different types of unitary buildings built to scale each adapted to be fitted upon corresponding parts of the outlined representations of the buildings to represent the ultimate appearance of the removable connected buildings according to the plan on the sheet, said sheet being composed of a plurality of parts capable of separation to allow additions of parts of other sheets to provide varying combinations of different size layouts, whereby certain buildings are used with all of the sheets and others with some of the sheets.

11. In a demonstration set for illustrating the combinations of standardized buildings, the combination of a plurality of layout sheets each having a different connected arrangement of the buildings outlined thereon to scale, and removable three-dimension models representing different types of unitary buildings built to scale each adapted to be fitted upon corresponding parts of the outlined representations of the buildings to represent the ultimate appearance of the removable connected buildings according to the plan on the sheet, each sheet being composed of a plurality of parts capable of separation to allow additions of parts of other sheets to provide varying combinations of different size layouts, the arrangements on said parts being such that the lines from one appear to be a continuation of another.

12. In a demonstration set for illustrating the combinations of standardized buildings, the combination of a sheet having a connected arrangement of the buildings outlined thereon to scale, and removable three-dimension models representing different types of unitary buildings built to scale each adapted to be fitted upon corresponding parts of the outlined representations of the buildings to represent the ultimate appearance of the removable connected buildings according to the plan on the sheet, said sheet being composed of a plurality of parts capable of separation to allow additions of parts of other sheets to provide varying combinations of different size layouts, the arrangements on said parts being such that the lines from one appear to be a continuation of another.

13. In a demonstration set for illustrating the combinations of standardized buildings, the combination of a sheet having a connected arrangement of the buildings outlined thereon to scale, and removable three-dimension models representing different types of unitary buildings built to scale each adapted to be fitted upon corresponding parts of the outlined representations of the buildings to represent the ultimate appearance of the removable connected buildings according to the plan on the sheet, said sheet being composed of a plurality of parts capable of separation to allow additions of parts of other sheets to provide varying combinations of different size layouts, whereby certain buildings are used with all of the sheets and others with some of the sheets, the arrangements on said parts being such that the lines from one appear to be a continuation of another.

14. In a demonstration set for illustrating different combinations of standardized buildings, the combination with a layout sheet or support, of a series of miniature buildings of different sizes and arrangement, imitative of full-sized buildings, such miniatures being adapted to be placed on said sheet or support in different groups, to exemplify to a prospective buyer just what he would obtain in purchasing his selected group.

FREDERIC J. KREUTZER.